US008798468B1

(12) United States Patent
Sindhu

(10) Patent No.: US 8,798,468 B1
(45) Date of Patent: *Aug. 5, 2014

(54) AMORTIZATION OF EXPENSIVE OPTICAL COMPONENTS

(71) Applicant: Juniper Networks, Inc., Sunnyvale, CA (US)

(72) Inventor: Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,998

(22) Filed: Nov. 27, 2013

Related U.S. Application Data

(63) Continuation of application No. 12/850,437, filed on Aug. 4, 2010, now Pat. No. 8,625,991.

(51) Int. Cl.
*H04J 14/00* (2006.01)

(52) U.S. Cl.
USPC .......... 398/68; 398/91; 398/79; 398/183; 398/82; 398/70; 398/66; 398/71; 372/32; 372/34; 372/38.02; 372/29.01

(58) Field of Classification Search
CPC ......... H04J 14/00; H04J 14/02; H04J 14/023; H04J 14/0242; H04J 14/0245; H04J 14/0246; H04J 14/025; H04B 10/50; H04B 10/505; H04B 10/5053

USPC .......... 398/66, 67, 68, 69, 70, 71, 72, 98, 99, 398/100, 1, 3, 4, 5, 7, 158, 159, 160, 82, 33, 398/38, 196, 197, 200, 201, 183, 79, 91, 398/182; 372/26, 50, 32, 34, 36, 38.02, 372/29.01

See application file for complete search history.

(56) References Cited

U.S. PATENT DOCUMENTS

| | | | |
|---|---|---|---|
| 6,163,395 A | 12/2000 | Nemecek et al. | |
| 6,201,820 B1 | 3/2001 | Palmer | |
| 6,285,479 B1 | 9/2001 | Okazaki et al. | |
| 6,819,478 B1 | 11/2004 | Islam | |
| 8,180,223 B2 * | 5/2012 | Bouda et al. | 398/89 |
| 2003/0138254 A1 * | 7/2003 | Otsuka et al. | 398/85 |
| 2010/0166424 A1 | 7/2010 | Nagarajan et al. | |
| 2010/0260496 A1 | 10/2010 | Tosetti et al. | |

OTHER PUBLICATIONS

Co-Pending U.S. Appl. No. 12/850,437, by Pradeep Sindhu, entitled "Amortization of Expensive Optical Components", filed Aug. 4, 2010, 53 pages.

* cited by examiner

*Primary Examiner* — Hanh Phan
(74) *Attorney, Agent, or Firm* — Harrity & Harrity, LLP

(57) ABSTRACT

A laser system includes an array of lasers that emit light at a number of different, fixed wavelengths. A group of optical transport systems connect to the laser system. Each of the optical transport systems is configured to modulate data signals onto the light from the laser system to create optical signals and transmit the optical signals on one or more optical fibers.

20 Claims, 14 Drawing Sheets

AMORTIZATION OF EXPENSIVE OPTICAL COMPONENTS

RELATED APPLICATION

This application is a continuation of U.S. patent application Ser. No. 12/850,437, filed Aug. 4, 2010, the disclosure of which is incorporated herein by reference.

BACKGROUND INFORMATION

Optical transport systems typically modulate a data signal on light to form an optical signal, and transmit the optical signal on an optical fiber. One type of optical transport system is a wavelength-division multiplexing (WDM) system that multiplexes multiple optical signals on a single optical fiber using different wavelengths of light. Currently, the most expensive components, in optical transport systems, include the optical-electrical-optical (O-E-O) components, such as the lasers.

SUMMARY

According to one implementation, a facility may include a laser bank, a multiplexer, a splitter, and a group of optical transport systems. The laser bank may include a group of lasers that output light at a number of different, fixed wavelengths. The multiplexer may connect to the laser bank. The multiplexer may receive the light, at the different, fixed wavelengths, output by the lasers, multiplex the light to form multiplexed light, and output the multiplexed light. The splitter may receive the multiplexed light, and split the multiplexed light into instances of multiplexed light. Each of the optical transport systems may receive one of the instances of multiplexed light, demultiplex the one of the instances of multiplexed light to recover the light, modulate a data signal on the recovered light to obtain an optical signal, and transmit the optical signal on an optical fiber.

According to another implementation, a facility may include a first laser bank that includes a first group of lasers; a second laser bank that includes a second group of lasers; a first multiplexer connected to the first laser bank; a second multiplexer connected to the second laser bank; a first amplifier connected to the first multiplexer; a second amplifier connected to the second multiplexer; a combiner connected to the first amplifier and the second amplifier; a splitter connected to the combiner; and a group of optical transport systems connected to the splitter.

According to yet another implementation, a facility may include a first laser bank that includes a first group of lasers; a second laser bank that includes a second group of lasers; a first multiplexer connected to the first laser bank; a second multiplexer connected to the second laser bank; a first amplifier connected to the first multiplexer; a second amplifier connected to the second multiplexer; a first splitter connected to the first amplifier; a second splitter connected to the second amplifier; and a group of optical transport systems connected to the first splitter and the second splitter.

According to a further implementation, one or more systems may include a laser system that includes a group of lasers that emit light at different, fixed wavelengths; and a group of optical transport systems that connect to the laser system, where each of the optical transport systems may modulate data signals onto the light from the laser system to create optical signals and transmit the optical signals on one or more optical fibers.

BRIEF DESCRIPTION OF THE DRAWINGS

The accompanying drawings, which are incorporated in and constitute a part of this specification, illustrate one or more systems and/or methods described herein and, together with the description, explain these systems and/or methods. In the drawings.

DETAILED DESCRIPTION

The following detailed description refers to the accompanying drawings. The same reference numbers in different drawings may identify the same or similar elements.

Figure 1:
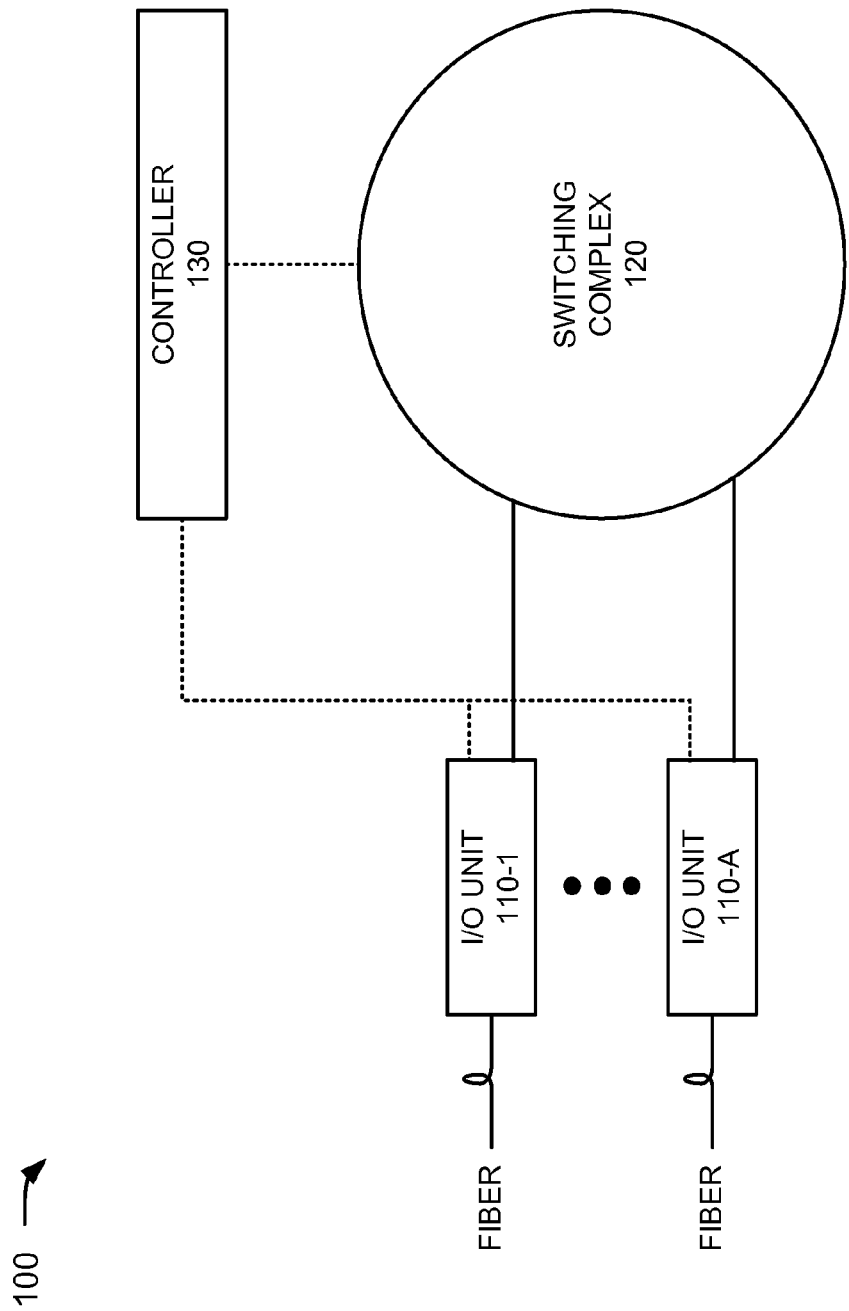
FIG. 1 is a diagram of an optical transport system.

FIG. 1 is a diagram of an optical transport system 100. An "optical transport system," as used herein, may include any system that receives an electronic data signal, modulates light based on the electronic data signal to form an optical signal, and transmits the optical signal on an optical fiber. Examples of an optical transport system include a router, a switch, an access point, a WDM transport device, or a system that includes multiple routers, switches, access points, and/or WDM transport devices, or a combination of a router, a switch, an access point, and/or a WDM transport device.

As shown in FIG. 1, optical transport system 100 may include a set of input/output ("I/O") units 110-1, ..., 110-A (collectively referred to as "I/O units 110," and individually as "I/O unit 110") (where A>1), a switching complex 120, and a controller 130. Any of the components, shown in FIG. 1, may be a logical entity whose functions are distributed among the physical components of optical transport system 100. For example, the functions of controller 130 may be performed by I/O units 110 and/or switching complex 120.

I/O unit 110 may include a component, or a set of components, to receive, transmit, and/or process traffic on an optical fiber. For example, an I/O unit 110 may correspond to an interface port, such as an inter-system interface port that connects to an optical fiber for transporting traffic to a location external to optical transport system 100, or an intra-system interface port that connects to an optical fiber for transporting traffic to a location internal to optical transport system 100. Alternatively, or additionally, I/O unit 110 may correspond to a line card, or the like, that includes some processing capabilities and a set of interface ports. Alternatively, or additionally, I/O unit 110 may include an I/O subsystem that includes a set of line cards, each of which may include a set of interface ports.

In one implementation, I/O unit 110 may function as an input interface that receives packets on an optical fiber. In another implementation, I/O unit 110 may function as an output interface that transmits packets on an optical fiber. In yet another implementation, I/O unit 110 may function as both an input interface and an output interface.

Switching complex 120 may include a connection or a group of connections to facilitate communication among I/O units 110 and/or controller 130. For example, switching complex 120 may include a single switch fabric or multiple switch fabrics associated with a single device or multiple, connected devices. Also, or alternatively, switching complex 120 may include processors, memories, and/or paths that permit communication among controller 130 and I/O units 110.

Controller 130 may include an engine that can make switching decisions, an engine that can make routing decisions, or an engine that can make both switching and routing decisions. In one implementation, controller 130 may include one or more processors, microprocessors, application specific integrated circuits (ASICs), field programming gate arrays (FPGAs), and/or processing logic that may be optimized for networking and/or communications and that may make a decision of how to switch or route packets received by the I/O units 110. Controller 130 may use one or more, of a number of, techniques for making the routing/switching decisions.

Figure 2:
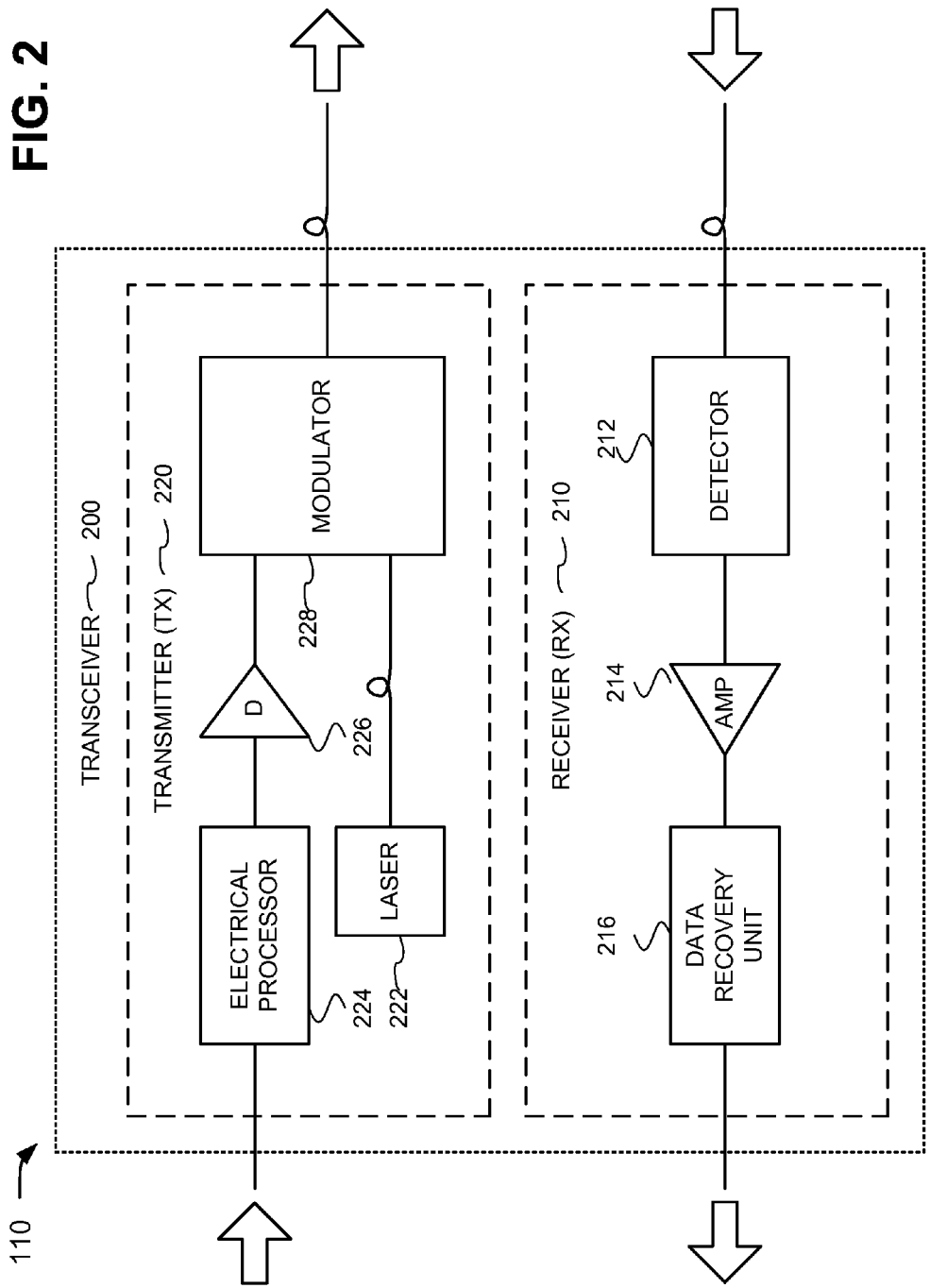
FIG. 2 is a diagram of a transceiver that may be used in an input/output unit of FIG. 1.

FIG. 2 is a diagram of a transceiver 200 that may be used in an I/O unit 110. As shown in FIG. 2, transceiver 200 may include a receiver (RX) 210 and a transmitter (TX) 220. Receiver 210 may include a detector 212, an amplifier 214, and a data recovery unit 216. Detector 212 may include a broadband detector, such as a PIN diode or an avalanche photodiode, that can detect light across an entire range of wavelengths from 1,310 nm to 1,600 nm. Amplifier 214 may include a trans-impedance amplifier that can amplify the signal from detector 212. Data recovery unit 216 may include a device that recovers digital data from an analog signal.

Transmitter 220 may include a laser 222, an electrical processor 224, a driver 226, and a modulator 228. Laser 222 may include a fixed or tunable laser. A fixed laser is constructed to output light at a particular wavelength (usually in the C-band of approximately 1530 nm-1565 nm). A tunable laser is constructed to be able to be tuned to output light in one of several possible wavelengths (also typically in the C-band). Tunable lasers are generally more expensive than fixed lasers. Both fixed and tunable lasers are temperature-dependent in that the lasers drift between wavelengths based on temperature. Thermo-electric cooling is sometimes used to maintain a laser at a certain temperature using a control loop.

Electrical processor 224 may include a processor, or processing logic, that receives an electrical data signal and performs some form of processing on the data signal. Driver 226 may include a driver circuit that controls the operation of modulator 228. Modulator 228 may include a modulator circuit that modulates the light from laser 222 with the data signal from electrical processor 224. The output of modulator 228 may be referred to as an optical signal that is transmitted at the particular wavelength of laser 222.

Figure 3:
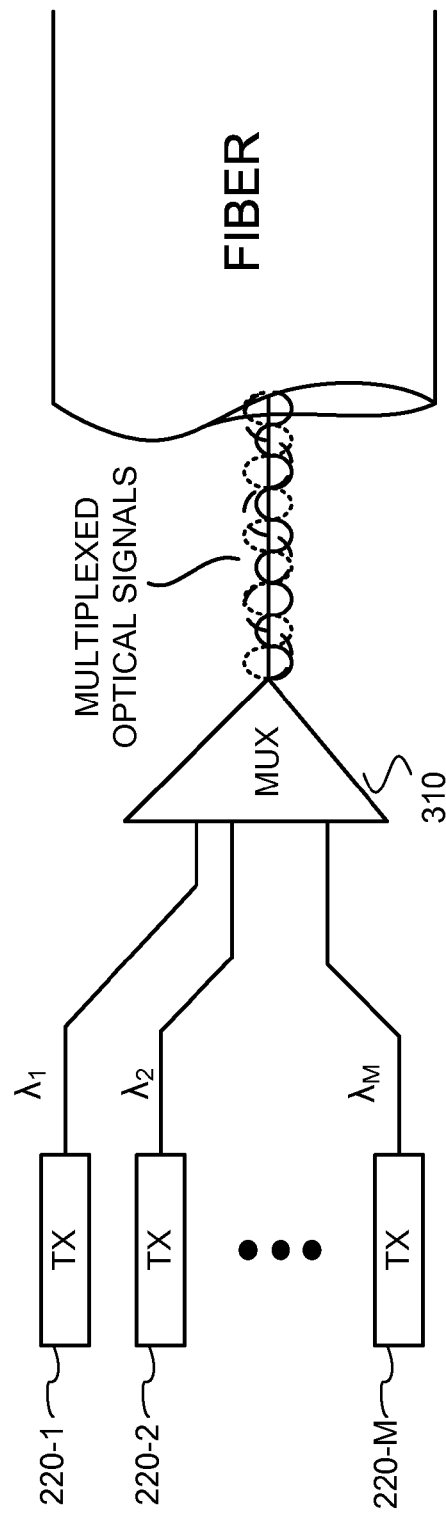
FIG. 3 is a diagram illustrating a multiplexing of optical signals onto an optical fiber.

The optical signal from multiple transmitters 220 may be multiplexed onto an optical fiber. FIG. 3 is a diagram illustrating the multiplexing of optical signals onto an optical fiber. As shown in FIG. 3, each transmitter 220-1, 220-2, . . . , 220-M (M>1) may output an optical signal at particular wavelength $\lambda_1, \lambda_2, \ldots, \lambda_M$, respectively. A multiplexer 310 includes a device that receives optical signals of different wavelengths and multiplexes the optical signals onto a single optical fiber, as multiplexed optical signals. This technique, of multiplexing multiple optical signals onto a single optical fiber using lasers that transmit light at different wavelengths, is commonly referred to as wavelength-division multiplexing.

A basic problem faced by optical transport systems, such as optical transport system 100, is how to get more transport bandwidth on an optical fiber. An optical fiber may be used to transmit an optical signal over a certain distance (e.g., local area (<500 m), metro (10 km-100 km), regional (600 km-800 km), and wide area (1,600 km-2,000 km)). As the distance of transmission increases, the more important it is to use lasers that are very narrow (i.e., very precise) in transmission bandwidth and that are cooled to within fine tolerances (e.g., within a few fractions of a degree Celsius). These narrow bandwidth lasers are very expensive. In a typical optical transport system, the cost of the optical-electrical-optical components may constitute over half of the cost of the optical transport system due to, among other things: (1) having to package the components of a transceiver including a separate laser per transceiver, (2) the cost of the lasers, and (3) having to cool the lasers to within fine tolerances.

Implementations, described herein, may remove the lasers from the transceivers and replace them with a single laser bank that can be used by all of the transceivers. As a result, better, more expensive lasers can be used and the cost of the lasers can be amortized.

Figure 4:
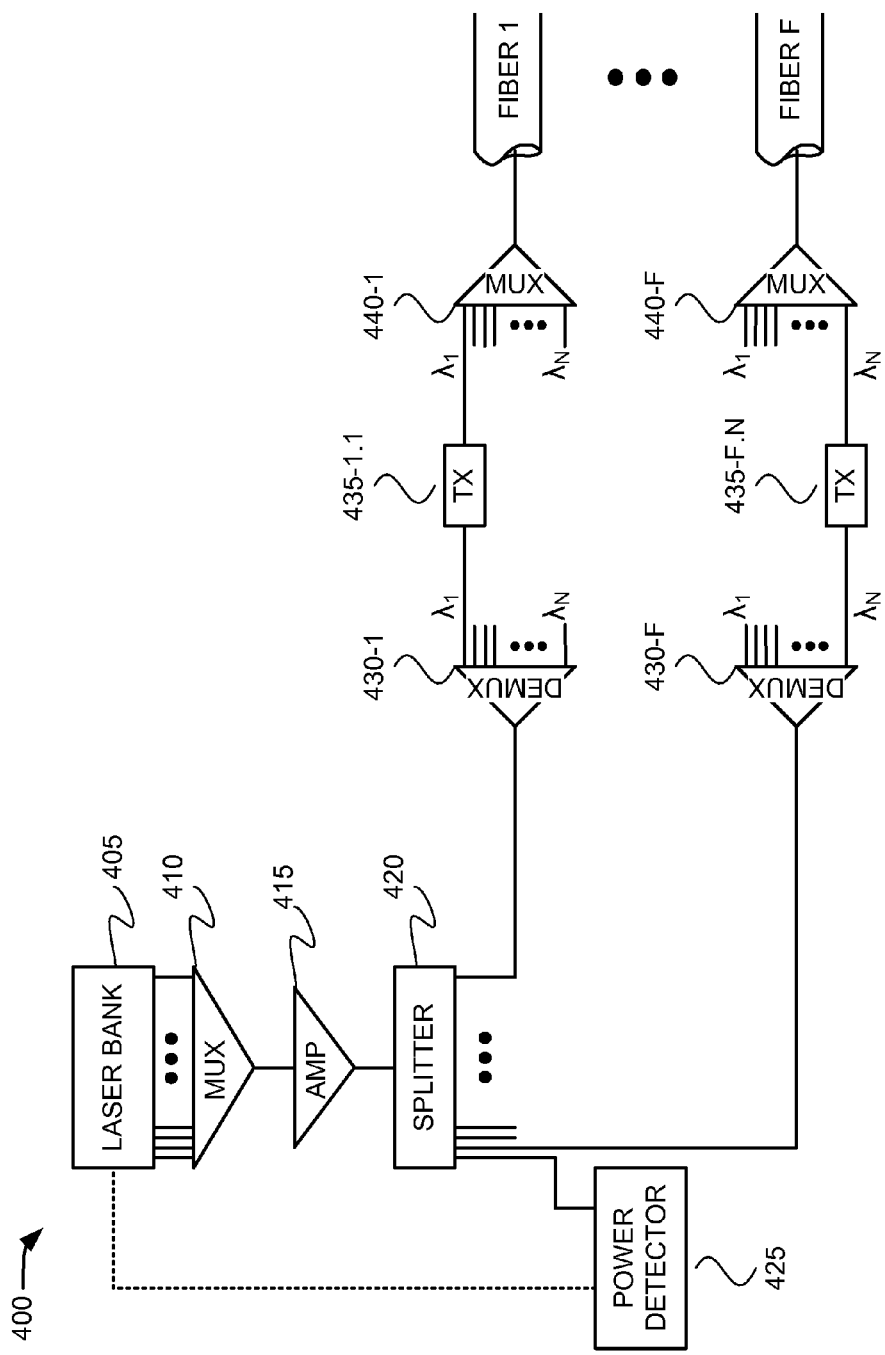
FIG. 4 is a diagram of a portion of a facility in which systems and methods, described herein, may be implemented.

FIG. 4 is a diagram of a portion of a facility 400 in which systems and methods, described herein, may be implemented. The term "facility," as used herein, is intended to refer to a collection of optical transport systems associated with a data center, a central office, a point of presence (POP), or the like. The components of a facility may be located in a single building or in multiple buildings spread apart by up to a few hundred meters.

As shown in FIG. 4, facility 400 may include a laser bank 405, a multiplexer 410, an amplifier 415, a splitter 420, a power detector 425, a set of demultiplexers 430-1, . . . , 430-F (referred to collectively as "demultiplexers 430," and individually as "demultiplexer 430"), a set of transmitters 435-1.1, . . . , 435-F.N (referred to collectively as "transmitters 435," and individually as "transmitter 435"), and a set of multiplexers 440-1, . . . , 440-F (referred to collectively as "multiplexers 440," and individually as "multiplexer 440"). While FIG. 4 shows a particular quantity and arrangement of components, in another implementation, there may be fewer, additional, different, or differently arranged components. For example, facility 400 may include a receiver and possibly other components of an optical transport system, such as a switch fabric or a controller. Also, a function described as being performed by one component may be performed by another component.

Laser bank 405 may include an array of fixed lasers (i.e., lasers that output light at fixed wavelengths) that are always turned on. The lasers, of laser bank 405, may be tightly packed on a common substrate (e.g., a metal block). The temperature, within laser bank 405 between two lasers, may be controlled to within a fraction of a degree Celsius. Thus, the temperature of the lasers, within laser bank 405, may track very closely to one another.

Figure 5A:
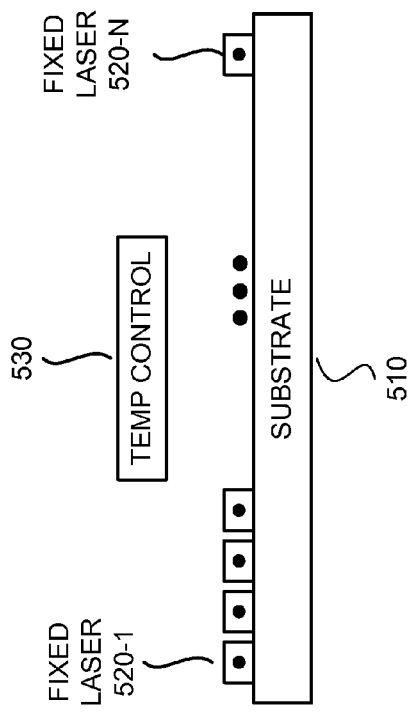
FIG. 5A is a diagram illustrating one particular arrangement of components of the laser bank of FIG. 4.

FIG. 5A is a diagram illustrating one particular arrangement of components of laser bank 405. As shown in FIG. 5A, laser bank 405 may include a substrate 510, an array of fixed lasers 520-1, . . . , 520-N (N>1, and in one particular implementation N>100) (collectively referred to as "lasers 520" and individually as "laser 520"), and a temperature control 530. While FIG. 5A illustrates a particular quantity and arrangement of components, in another implementation, there may be fewer, additional, different, or differently arranged components. For example, temperature control 530 may be located external to laser bank 405.

Substrate 510 may include a conductive material (e.g., metal) upon which lasers 520 are mounted. Each of lasers 520 may include a continuous wave (CW) laser that is always turned on. Each of lasers 520 may be constructed to transmit light at a different wavelength. Lasers 520 can be packed tightly together on substrate 510, such as more tightly than 50 GHz. Temperature control 530 may include a thermo-electric cooling system or another form of cooling that can control the temperature of lasers 520 so that all of lasers 520 are operating at approximately the same temperature (e.g., with a maximum temperature difference between adjacent lasers being as small as a fraction of a degree Celsius). In this way, even if one of lasers 520 were to drift, the other lasers 520 would drift in the same manner.

Figure 5B:
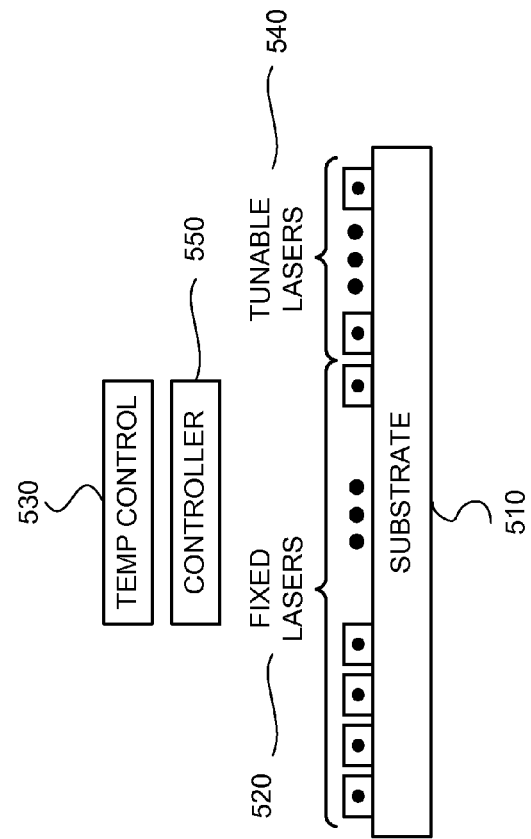
FIG. 5B is a diagram illustrating another particular arrangement of components of the laser bank of FIG. 4.

FIG. 5B is a diagram illustrating another particular arrangement of components of laser bank 405. As shown in FIG. 5B, laser bank 405 may include a substrate 510, an array of fixed lasers 520, a temperature control 530, a pool of tunable lasers 540, and a controller 550. Substrate 510, lasers 520, and temperature control 530 may be the same as substrate 510, lasers 520, and temperature control 530, respectively, as described above with regard to FIG. 5A. While FIG. 5B illustrates a particular quantity and arrangement of components, in another implementation, there may be fewer, additional, different, or differently arranged components. For example, temperature control 530 or controller 550 may be located external to laser bank 405.

Tunable lasers 540 may include a pool of tunable lasers that are normally turned off and turned on when needed. Each of tunable lasers 540 may be controlled to operate at any wavelength in the C-band of wavelengths (e.g., approximately 1530 nm-1565 nm). In another implementation, each of tunable lasers 540 may be controlled to operate at any wavelength, whether within or outside of the C-band of wavelengths. The purpose of tunable lasers 540 is to replace a failed one of fixed lasers 520. In other words, if one of fixed lasers 520 fails, one of tunable lasers 540 can be turned on and tuned to the wavelength of the failed fixed laser 520, and can thereafter replace the failed fixed laser 520. In one implementation, the swapping of a tunable laser 540 for a failed fixed laser 520 can occur in less than a millisecond.

Controller 550 may include a processor or some other form of control unit. Controller 550 may control the swapping of a tunable laser 540 for a failed fixed laser 520. For example, controller 550 may receive a control signal from power detector 425 and, based on this control signal, identify one of fixed lasers 520 as a failed laser that needs to be swapped with a tunable laser 540, turn on tunable laser 540, and tune tunable laser 540 to the wavelength of the failed laser 520.

Figure 5C:
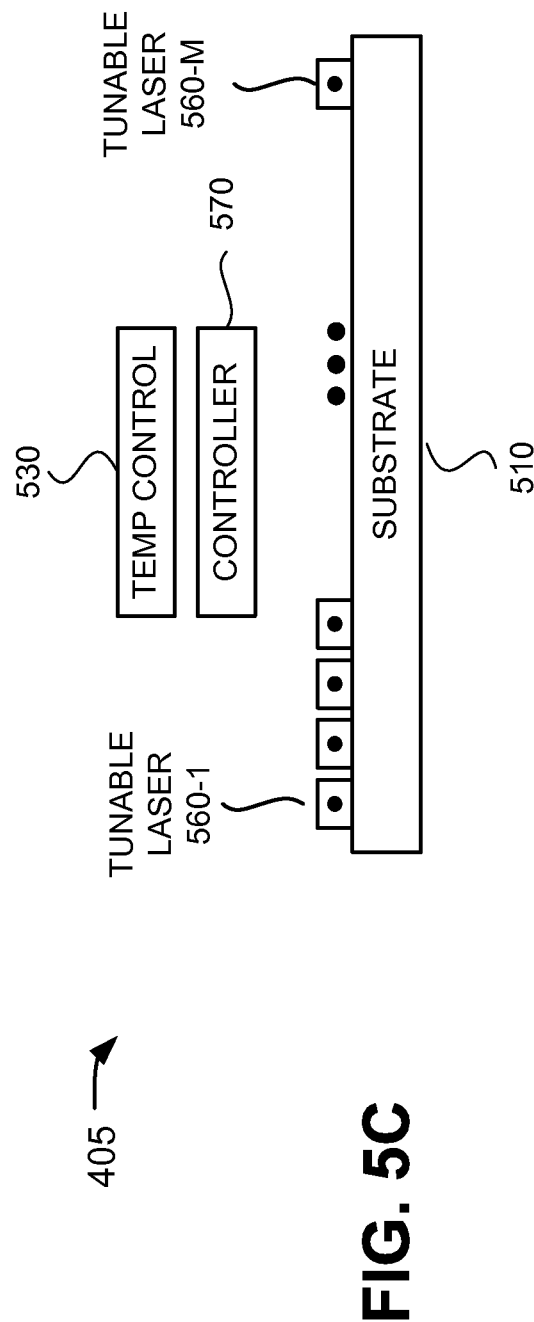
FIG. 5C is a diagram illustrating yet another particular arrangement of components of the laser bank of FIG. 4.

FIG. 5C is a diagram illustrating another particular arrangement of components of laser bank 405. As shown in FIG. 5C, laser bank 405 may include a substrate 510, a temperature control 530, a pool of tunable lasers 560, and a controller 570. Substrate 510 and temperature control 530 may be the same as substrate 510 and temperature control 530, respectively, as described above with regard to FIG. 5A. While FIG. 5C illustrates a particular quantity and arrangement of components, in another implementation, there may be fewer, additional, different, or differently arranged components. For example, temperature control 530 or controller 570 may be located external to laser bank 405.

Tunable lasers 560 may include a pool of tunable lasers that may be controlled to operate at any wavelength in the C-band of wavelengths (e.g., approximately 1530 nm-1565 nm). In another implementation, each of tunable lasers 560 may be controlled to operate at any wavelength, whether within or outside of the C-band of wavelengths. A first group of lasers, of tunable lasers 560, may be set to particular wavelengths (e.g., N different wavelengths), and a second group of lasers, of tunable lasers 560, may be used in case of a failure of a laser in the first group. For example, the pool of tunable lasers may include M tunable lasers that can operate in N different wavelengths (where M>N). Thus, the pool of tunable lasers may include M-N spare lasers. A spare laser, in the second group of lasers, may be used to replace a failed laser in the first group of lasers. In other words, if a laser, in the first group of lasers, fails, one of the spare lasers, in the second group of lasers, can be turned on and tuned to the wavelength of the failed laser, and can thereafter replace the failed laser. In one implementation, the swapping of a spare laser for a failed laser can occur in less than a millisecond.

Controller 570 may include a processor or some other form of control unit. Controller 570 may control the tuning of tunable lasers 560, and the swapping of a spare laser for a failed laser. For example, controller 570 may receive a control signal from power detector 425 and, based on this control signal, identify one of lasers 560 as a failed laser that needs to be swapped with a spare laser, turn on a spare laser, and tune the spare laser to the wavelength of the failed laser.

Returning to FIG. 4, multiplexer 410 may include a multiplexer device that receives light of different wavelengths and multiplexes the light onto a common optical fiber. For example, multiplexer 410 may receive the light from the lasers of laser bank 405 and multiplex the light.

Amplifier 415 may include an optical amplifier that amplifies light. For example, amplifier 415 may receive the multiplexed light and amplify the multiplexed light by a particular amount. Assume, for example, that splitter 420 is a 1:F splitter, the amount of loss incurred due to the splitting may be $\{-3*\text{Log}_2 F\}$ dB. Thus, in this example, amplifier 415 may amplify the multiplexed light by $\{3*\text{Log}_2 F\}$ dB. Therefore, if F equals 32, then the amount of loss incurred due to the splitting may be −15 db and, thus, amplifier 415 may amplify the multiplexed light by 15 db to offset the loss incurred by the splitting. Loss may also occur at each coupling of fibers. The coupling loss may be on the order of −1 dB. Amplifier 415 may also take into account this coupling loss. In some instances, the laser power less the loss offsets might be much higher (or lower) than a minimum receiver threshold (e.g., the minimum amount of laser power required by the receiver). In such cases, the power amplification requirements, of amplifier 415, can be lower (or higher) or not required at all.

Splitter 420 may include an optical splitter that receives light on an input optical fiber and splits the light evenly among a set of output optical fibers. For example, splitter 420 may receive the multiplexed light from amplifier 415 and split the multiplexed light onto a set of optical fibers. In one implementation, splitter 420 may split the multiplexed light by the quantity of fibers (e.g., 1:F splitter). In another implementation, splitter 420 may split the multiplexed light by one plus the quantity of fibers (e.g., 1:(1+F) splitter). In yet another implementation, splitter 420 may split the multiplexed light by some subset of the quantity of fibers (e.g., one split for each group of G fibers (where G>1)).

Power detector 425 may include a device that monitors the power level of the light output by a laser and outputs a control signal when the power level falls below a particular threshold. For example, power detector 425 may monitor the power of the light output by each of the lasers of laser bank 405 to determine whether the power level of any of the lasers falls below the particular threshold. When the power level of a particular fixed laser 520 falls below the particular threshold, power detector 425 may output a control signal, to laser bank 405, instructing laser bank 405 to swap one of tunable lasers 540 for a particular fixed laser 520. As explained above, this swapping can occur very quickly, such as in less than a millisecond. In one implementation, the control signal may include an identifier for the particular fixed laser 520.

Demultiplexer 430 may include a demultiplexer device that receives multiplexed light of different wavelengths and demultiplexes the light onto separate optical fibers, such as one optical fiber per wavelength. For example, demultiplexer 430 may receive the multiplexed light from splitter 420 and demultiplex the light onto N optical fibers (e.g., one optical fiber for each of the N fixed lasers 520).

Transmitter 435 may include a collection of components to facilitate the transmission of an optical signal. In one implementation, there may be a separate transmitter 435 per wavelength and per optical fiber. In other words, if there are N wavelengths and F separate optical fibers, then there may be N*F transmitters 435. For example, for optical fiber 1, there may be transmitters 435-1.1 through 435-1.N; and for optical fiber F, there may be transmitters 435-F.1 through 435-F.N.

Figure 6:
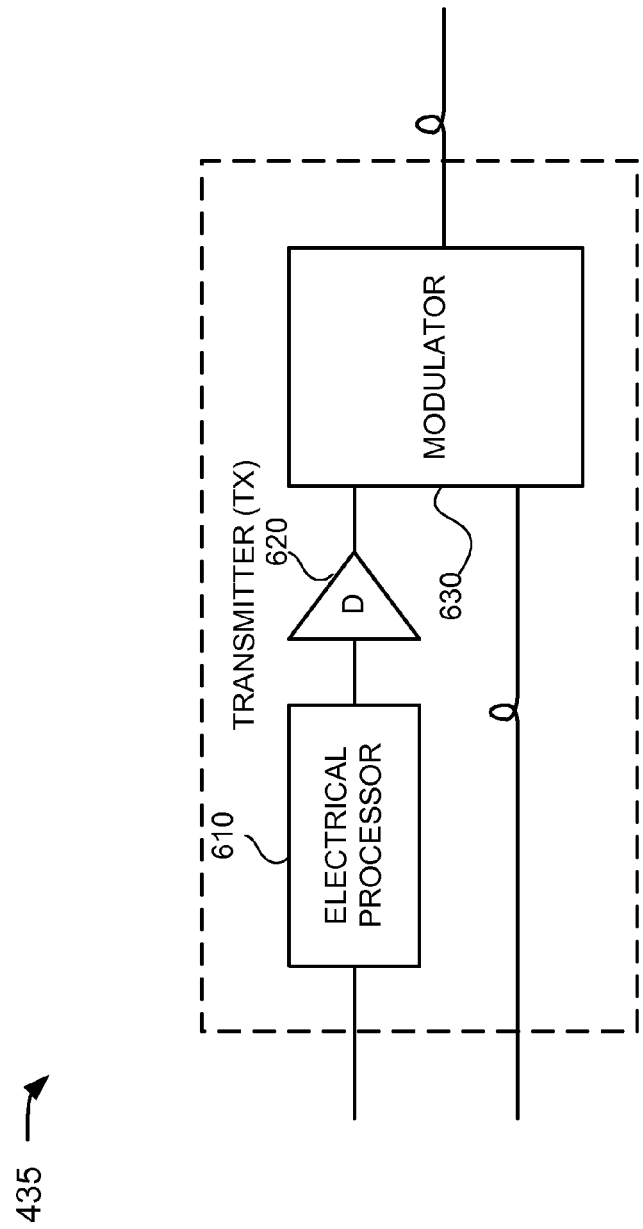
FIG. 6 is a diagram illustrating an example of components of a transmitter of FIG. 4.

FIG. 6 is a diagram illustrating an example of components of transmitter 435. As shown in FIG. 6, transmitter 435 may include an electrical processor 610, a driver 620, and a modulator 630. While FIG. 6 shows a particular quantity and arrangement of components, in another implementation, there may be fewer, additional, different, or differently arranged components. Also, a function described as being performed by one component may be performed by another component.

Electrical processor 610 may include a processor, or processing logic, that receives an electrical data signal and performs some form of processing on the data signal. Driver 620 may include a driver circuit that controls the operation of modulator 630. Modulator 630 may include a modulator circuit that modulates the light from demultiplexer 430 with the data signal from electrical processor 610. In one implementation, modulator 630 may include a polarization insensitive modulator circuit. The output of modulator 630 may be referred to as an optical signal that is transmitted at a particular wavelength (e.g., the particular wavelength of the light from demultiplexer 430).

As can be seen from a comparison of transmitter 435 (FIG. 5) to transmitter 220 (FIG. 2), transmitter 435 contains no laser. Rather, the laser has been relocated to laser bank 405. Thus, rather than requiring N*F separate lasers, facility 400 includes N separate lasers that are reused. This greatly reduces the cost of transmitter 435 as compared to transmitter 220.

Returning to FIG. 4, multiplexer 440 may include a multiplexer device that receives optical signals of different wavelengths and multiplexes the optical signals onto a common optical fiber. For example, multiplexer 440 may receive the optical signals from transmitters 435 and multiplex the optical signals onto an optical fiber (e.g., one of the F optical fibers).

Figure 7:
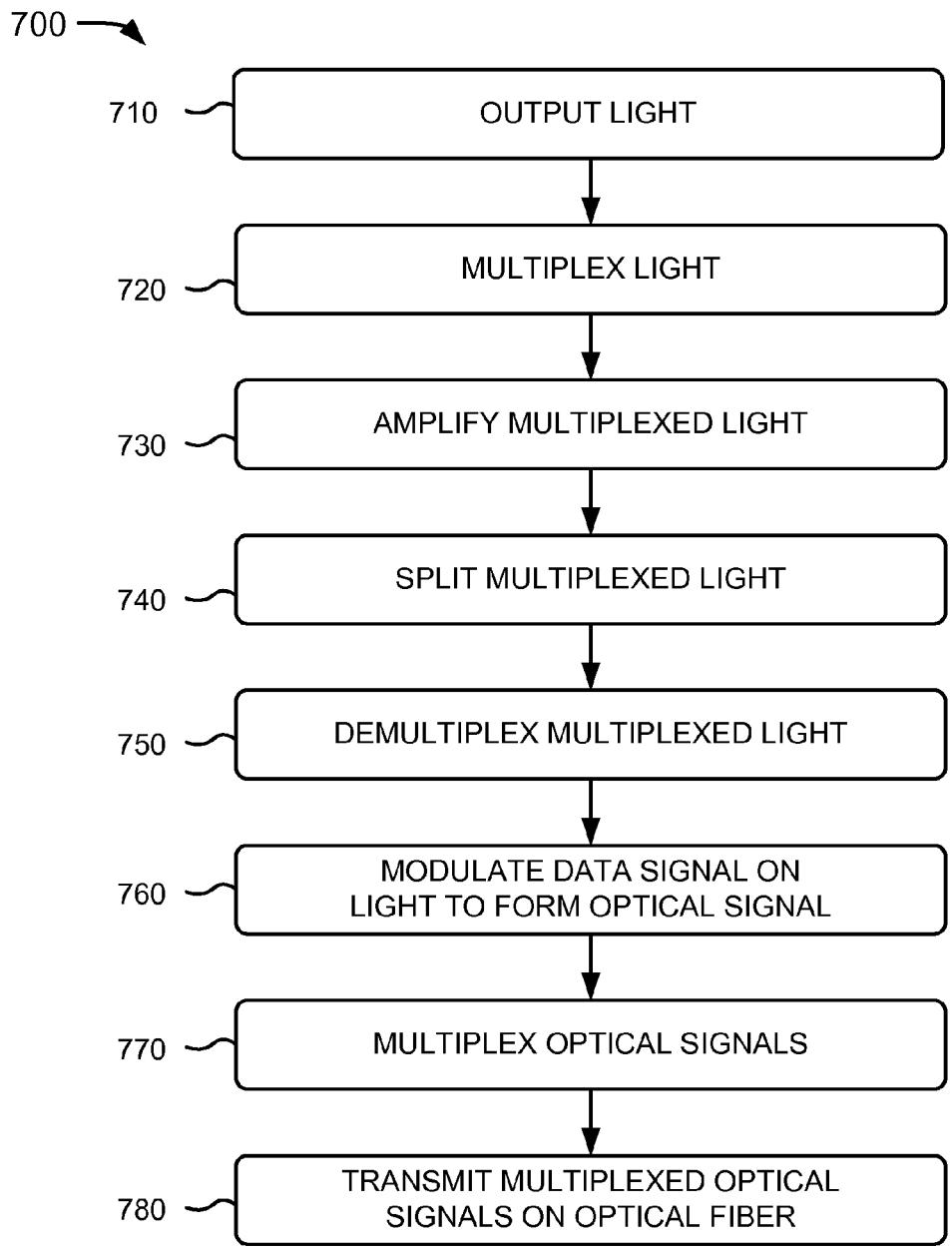
FIG. 7 is a flowchart of an example of a process for transmitting optical signals on optical fibers.

FIG. 7 is a flowchart of an example of a process 700 for transmitting optical signals on optical fibers. Process 700 may be performed by components within a facility, such as facility 400. For the description to follow, reference will be made to components of facility 400 in FIG. 4.

Process 700 may include outputting light (block 710). For example, the fixed lasers (e.g., lasers 520), of laser bank 405, may output light at different wavelengths. As described above, laser bank 405 may include N fixed lasers 520, with each fixed laser 520 outputting light at a different wavelength. If all of fixed lasers 520 are operational, then tunable lasers 540 may be turned off at this time. If one or more of fixed lasers 520 have previously failed, then these one or more fixed lasers 520 may have been replaced with tunable lasers 540, as described above.

The light may be multiplexed (block 720). For example, multiplexer 410 may receive the light outputted by laser bank 405, multiplex the light to create multiplexed light, and output the multiplexed light on a common optical fiber. As described above, laser bank 405 may output light of N different wavelengths. Multiplexer 410 may receive these N different wavelengths of light, and multiplex the N different wavelengths of light together to form multiplexed light.

The multiplexed light may be amplified (block 730). For example, amplifier 415 may receive the multiplexed light, from multiplexer 410, and amplify the multiplexed light. As described above, multiplexer 410 may multiplex N different wavelengths of light. Amplifier 415 may receive the multiplexed N different wavelengths of light and amplify the multiplexed light across all of the N wavelengths.

The multiplexed light may be split (block 740). For example, splitter 420 may receive the multiplexed light after being amplified by amplifier 415. Splitter 420 may split the multiplexed light a particular number of times. In one implementation, splitter 420 may split the multiplexed light for each of the optical fibers output from facility 400. For example, if there are F optical fibers, then splitter 420 may split the multiplexed light F times (e.g., a 1:F split).

In another implementation, splitter 420 may split the multiplexed light for each of the optical fibers, output from facility 400, plus one. For example, if there are F optical fibers, then splitter 420 may split the multiplexed light F+1 times (e.g., a 1:(F+1) split). The extra split may be used by power detector 425 to detect a failed fixed laser 520.

In yet another implementation, splitter 420 may split the multiplexed light for each of a number of subsets of the optical fibers output from facility 400. For example, if there are F optical fibers and G optical fibers per subset, then splitter 420 may split the multiplexed light F/G times (e.g., a 1:F/G split).

In a further implementation, splitter 420 may split the multiplexed light for each of a number of subsets of the optical fibers, output from facility 400, plus one. For example, if there are F optical fibers and G optical fibers per subset, then splitter 420 may split the multiplexed light F/G+1 times (e.g., a 1:(F/G+1) split). The extra split may be used by power detector 425 to detect a failed fixed laser 520.

For each split of the multiplexed light, blocks 750 through 780 may be performed. For example, the multiplexed light may be demultiplexed (block 750). For example, demultiplexer 430 may receive a split of the multiplexed light and may demultiplex the multiplexed light. As described above, the multiplexed light may contain N different wavelengths of light. Demultiplexer 430 may separate each of the N different wavelengths of light and output each of the N different wavelengths of light on a separate optical fiber.

A data signal may be modulated on the light to form an optical signal (block 760). For example, a modulator 630 (FIG. 6) may receive a data signal from electrical processor 610, as described above. Modulator 630 may also receive light, of a particular wavelength, from demultiplexer 430, and modulate the data signal on the light to form an optical signal. As shown in FIG. 4, each wavelength of light may be separately modulated for each of the different optical fibers output from facility 400. In other words, if there are N different wavelengths and F different optical fibers, then N*F modulators 630 would produce N*F optical signals.

The optical signals may be multiplexed and transmitted on an optical fiber (blocks 770 and 780). For example, multiplexer 440 may receive optical signals from modulators 630 and multiplex the optical signals to form multiplexed optical signals. As described above, N different modulators 630 may produce N optical signals of N different wavelengths. Multiplexer 440 may receive the N optical signals outputted by modulators 630, multiplex the optical signals to create multiplexed optical signals, and output the multiplexed optical signals on a common optical fiber that exits facility 400.

Figure 8:
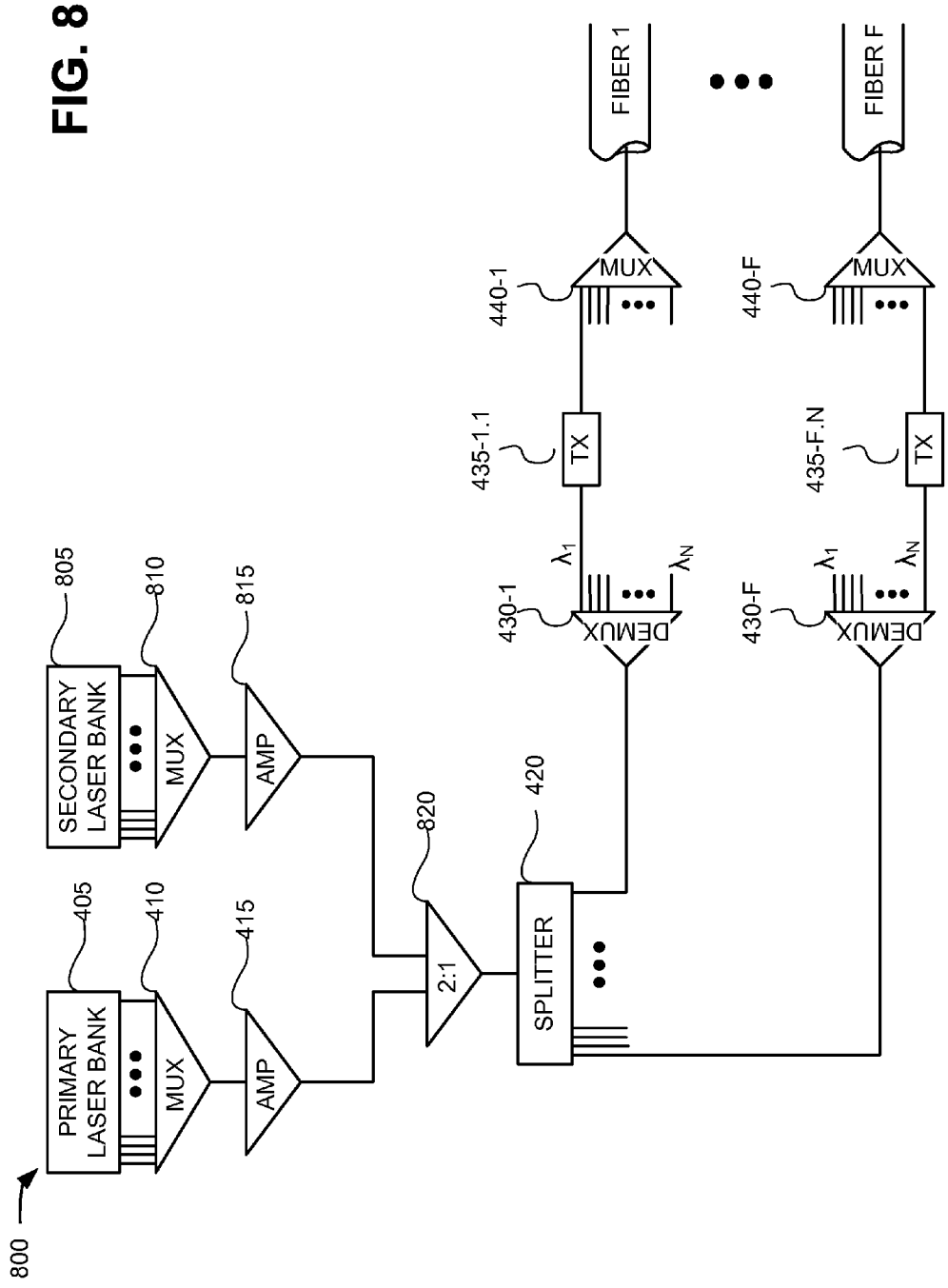
FIG. 8 is a diagram of a portion of a facility according to another implementation described herein.

FIG. 8 is a diagram of a portion of a facility 800 according to another implementation described herein. While FIG. 8 shows a particular quantity and arrangement of components, in another implementation, there may be fewer, additional, different, or differently arranged components. For example, facility 800 may include a power detector similar to power detector 425 of FIG. 4. Also, a function described as being performed by one component, of facility 800, may be performed by another component, of facility 800.

As shown in FIG. 8, facility 800 may include a primary laser bank 405, a secondary laser bank 805, a primary multiplexer 410, a secondary multiplexer 810, a primary amplifier 415, a secondary amplifier 815, a combiner 820, a splitter 420, a set of demultiplexers 430, a set of transmitters 435, and a set of multiplexers 440. Primary laser bank 405, primary multiplexer 410, primary amplifier 415, splitter 420, demultiplexers 430, transmitters 435, and multiplexers 440 may correspond to similarly-labeled components described above with regard to FIG. 4.

Secondary laser bank 805 may be constructed identical to primary laser bank 405 and be used as a backup to primary laser bank 405. Similar to primary laser bank 405, secondary laser bank 805 may include an array of fixed lasers (e.g., lasers 520) and a pool of tunable lasers (e.g., lasers 540), or an array of tunable lasers 560. When primary laser bank 405 is operational, the lasers, of secondary laser bank 805, may be turned off. When it is determined that primary laser bank 405 has failed (e.g., when the quantity of fixed lasers, which have failed, equals or exceeds the quantity of available tunable lasers, or when the quantity of lasers, which have failed, equals or exceeds the quantity of spare lasers), the lasers, of secondary laser bank 805, may be turned on. In this case, the lasers, of primary laser bank 405, may be turned off and repaired.

In an alternative implementation, both primary laser bank 405 and secondary laser bank 805 may be operational at the same time. For example, certain lasers in primary laser bank 405 may be set as primary lasers for certain wavelengths and certain lasers in secondary laser bank 805 may be set as secondary lasers for these certain wavelengths, while certain other lasers in secondary laser bank 805 may be set as primary lasers for certain other wavelengths and certain other lasers in primary laser bank 405 may be set as secondary lasers for these certain other wavelengths. In other words, assume that lasers 1-10, in primary laser bank 405, are set as primary lasers for wavelengths $\lambda1$-$\lambda10$; that lasers 11-20, in primary laser bank 405, are set as secondary lasers for wavelengths $\lambda11$-$\lambda20$; that lasers 1-10, in secondary laser bank 805, are set as secondary lasers for wavelengths $\lambda1$-$\lambda10$; and that lasers 11-20, in secondary laser bank 805, are set as primary lasers for wavelengths $\lambda11$-$\lambda20$. A secondary laser may be turned off and used in case of a failure in a primary laser. When a primary laser fails, the secondary laser may be turned on to replace the failed primary laser.

Secondary multiplexer 810 and secondary amplifier 815 may include similar devices that operate in a similar manner to primary multiplexer 410 and primary amplifier 415, respectively, as described above with regard to facility 400 in FIG. 4.

Combiner 820 may include an optical combiner that receives light on one or more input optical fibers and combines the light on a common optical fiber. In one implementation, combiner 820 may include a 2:1 optical combiner. Combiner 820 may receive the multiplexed light from amplifier 415 or amplifier 815 (as described above, lasers of primary laser bank 405 and/or secondary laser bank 805 may be operational and turned on and other lasers of primary laser bank 405 and/or secondary laser bank 805 may be turned off and, thus, output no light) and output the multiplexed light on an optical fiber connected to splitter 420.

In operation of facility 800, one of primary laser bank 405 or secondary laser bank 805 may be turned on and may output light of different wavelengths, and the other one of primary laser bank 405 or secondary laser bank 805 may be turned off and may output no light. Alternatively, certain lasers of primary laser bank 405 and certain lasers of secondary laser bank 805 may be turned on and may output light of different wavelengths, and certain other lasers of primary laser bank 405 and certain other lasers of secondary laser bank 805 may be turned off and may output no light.

Combiner 820 may receive light from primary laser bank 405 and/or secondary laser bank 805 (after multiplexing by multiplexer 410/810 and amplifying by amplifier 410/810), and provide the light to splitter 420. The rest of the operation of facility 800 may be similar to the operation of facility 400 described above.

Figure 9:
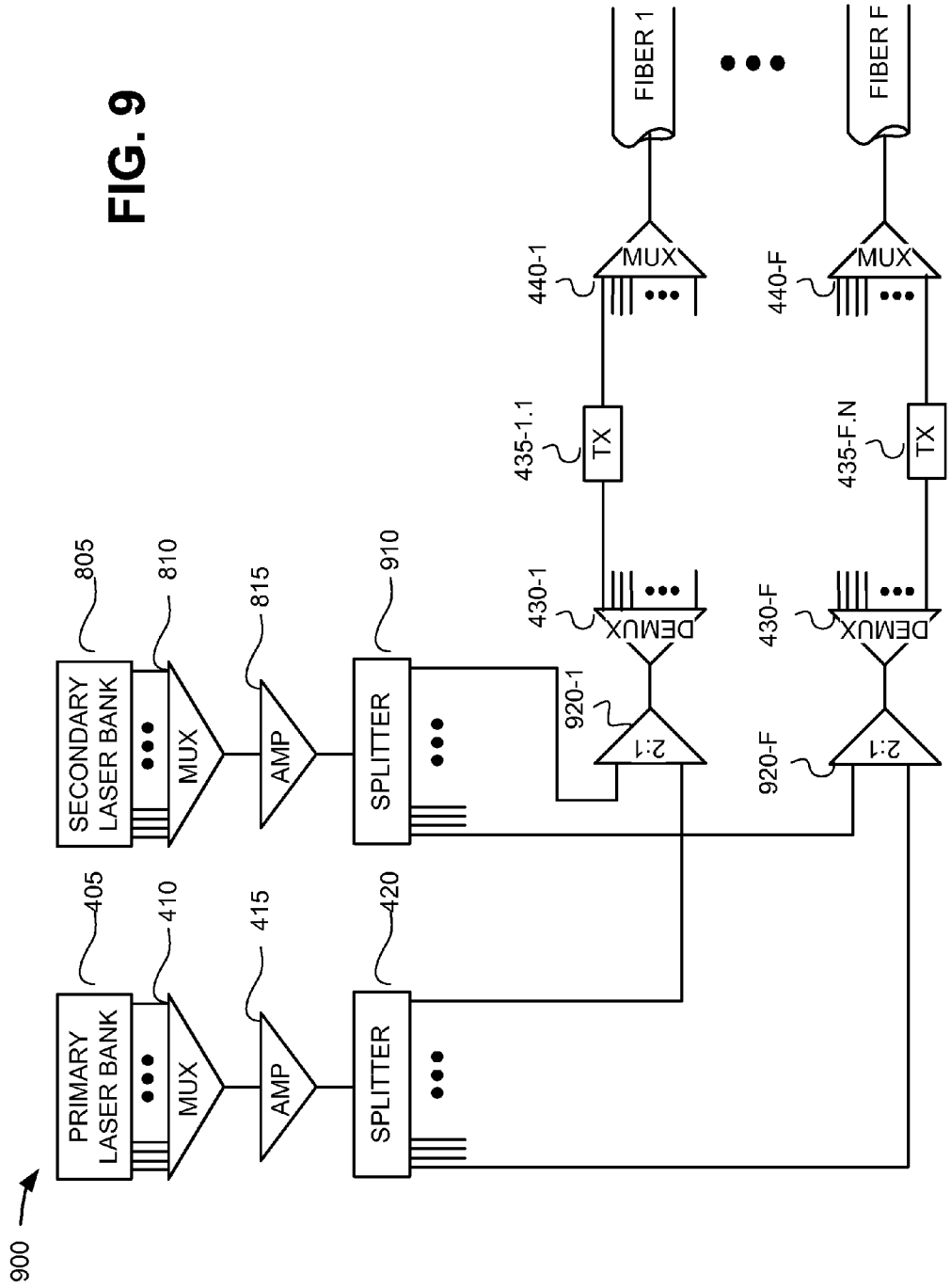
FIG. 9 is a diagram of a portion of a facility according to yet another implementation described herein.

FIG. 9 is a diagram of a portion of a facility 900 according to yet another implementation described herein. While FIG. 9 shows a particular quantity and arrangement of components, in another implementation, there may be fewer, additional, different, or differently arranged components. For example, facility 900 may include a power detector similar to power detector 425 of FIG. 4. Also, a function described as being performed by one component, of facility 900, may be performed by another component, of facility 900.

As shown in FIG. 9, facility 900 may include a primary laser bank 405, a secondary laser bank 805, a primary multiplexer 410, a secondary multiplexer 810, a primary amplifier 415, a secondary amplifier 815, a primary splitter 420, a secondary splitter 910, a set of combiners 920-1, . . . , 920-F (referred to collectively as "combiners 920," and individually as "combiner 920"), a set of demultiplexers 430, a set of transmitters 435, and a set of multiplexers 440. Primary laser bank 405, secondary laser bank 805, primary multiplexer 410, secondary multiplexer 810, primary amplifier 415, secondary amplifier 815, primary splitter 420, demultiplexers 430, transmitters 435, and multiplexers 440 may correspond to similarly-labeled components described above with regard to FIGS. 4 and 8.

Secondary splitter 910 may include a similar device that operates in a similar manner to primary splitter 420, as described above with regard to facility 400 in FIG. 4. Each of combiners 920 may include an optical combiner that receives light on one or more input optical fibers and combines the light on a common optical fiber. In one implementation, combiner 920 may include a 2:1 optical combiner. Combiner 920 may receive the multiplexed light from splitter 420 and/or splitter 910 (as described above, lasers of primary laser bank 405 and/or secondary laser bank 805 may be operational and turned on and other lasers of primary laser bank 405 and/or secondary laser bank 805 may be turned off and, thus, output no light) and output the multiplexed light on an optical fiber connected to demultiplexer 430.

In operation of facility 900, one of primary laser bank 405 or secondary laser bank 805 may be turned on and may output light of different wavelengths, and the other one of primary laser bank 405 or secondary laser bank 805 may be turned off and may output no light. Alternatively, as described above, certain lasers of primary laser bank 405 and certain lasers of secondary laser bank 805 may be turned on and may output light of different wavelengths, and certain other lasers of primary laser bank 405 and certain other lasers of secondary laser bank 805 may be turned off and may output no light.

Combiner 920 may receive light from primary laser bank 405 and/or secondary laser bank 805 (after multiplexing by multiplexer 410/810, amplifying by amplifier 410/810, and splitting by splitter 420/910), and provide the light to demultiplexer 430. The rest of the operation of facility 900 may be similar to the operation of facility 400 described above.

Figure 10:
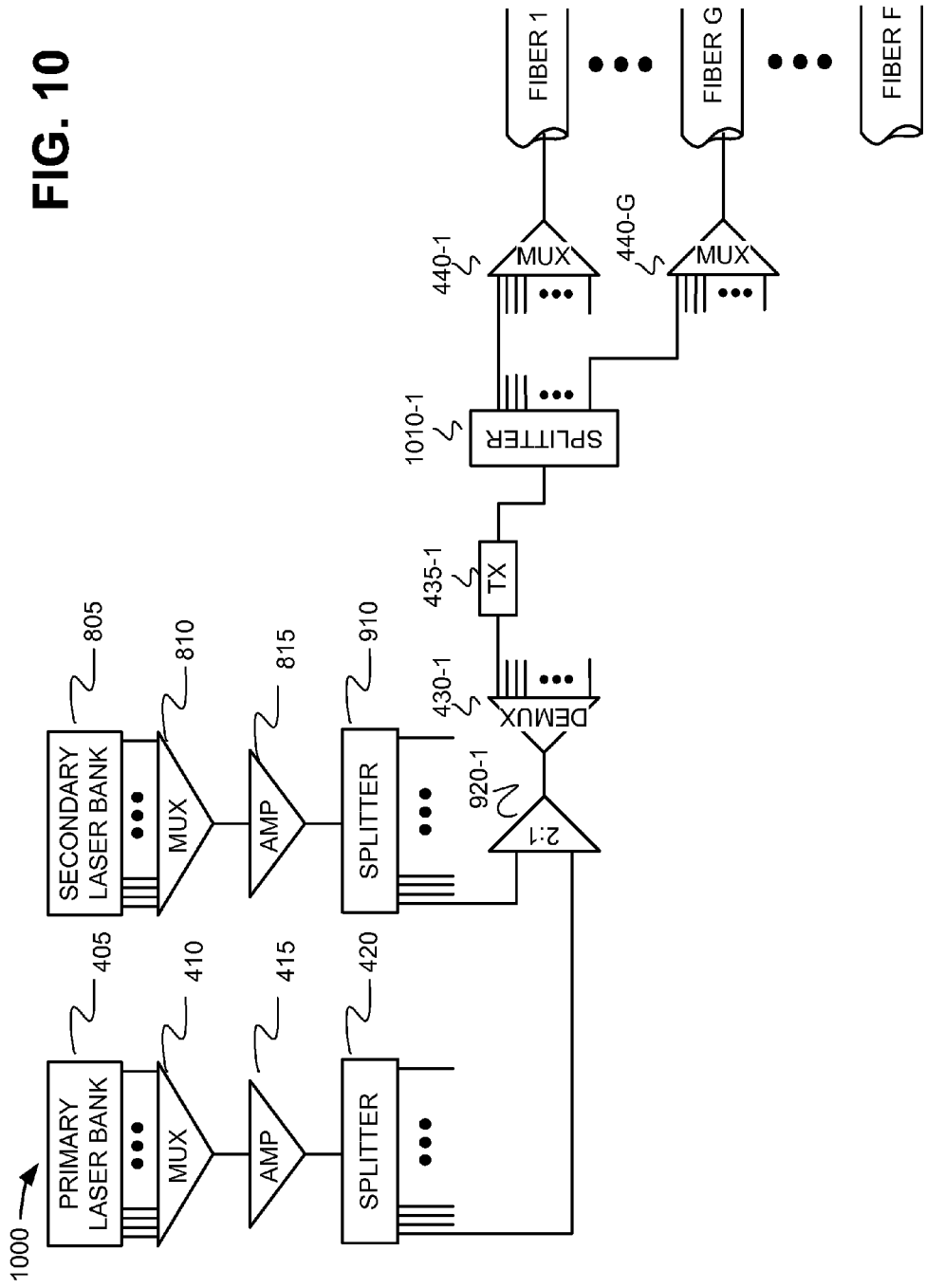
FIG. 10 is a diagram of a portion of a facility according to a further implementation described herein.

FIG. 10 is a diagram of a portion of a facility 1000 according to a further implementation described herein. While FIG. 10 shows a particular quantity and arrangement of components, in another implementation, there may be fewer, additional, different, or differently arranged components. For example, facility 1000 may include a power detector similar to power detector 425 of FIG. 4. Also, a function described as being performed by one component, of facility 1000, may be performed by another component, of facility 1000.

As shown in FIG. 10, facility 1000 may include a primary laser bank 405, a secondary laser bank 805, a primary multiplexer 410, a secondary multiplexer 810, a primary amplifier 415, a secondary amplifier 815, a primary splitter 420, a secondary splitter 910, a set of combiners 920, a set of demultiplexers 430, a set of transmitters 435, a set of splitters 1010-1, . . . , 1010-F/G, and a set of multiplexers 440. Primary laser bank 405, secondary laser bank 805, primary multiplexer 410, secondary multiplexer 810, primary amplifier 415, secondary amplifier 815, primary splitter 420, secondary splitter 910, combiners 920, demultiplexers 430, transmitters 435, and multiplexers 440 may correspond to similarly-labeled components described above with regard to FIGS. 4, 8, and 9.

In facility 1000, however, the quantity of combiners 920, demultiplexers 430, and transmitters 435 may differ from the quantity of combiners 920, demultiplexers 430, and transmitters 435 described with regard to FIGS. 4 and 9. In facility 1000, a single combiner 920, a single demultiplexer 430, and N transmitters 435 may be included for each subset of optical fibers. For example, if there are G optical fibers in a subset of optical fibers and there are F optical fibers total, then facility 1000 may include F/G combiners 920, F/G demultiplexers 430, and N*F/G transmitters 435.

Each of splitters 1010 may include an optical splitter that receives light on an input optical fiber and splits the light evenly among a set of output optical fibers. For example, splitter 1010 may receive an optical signal (e.g., light, of a particular wavelength, that has been modulated with a data signal) from transmitter 435, and split the optical signal onto a set of optical fibers. In one implementation, splitter 1010 may split the optical signal by the quantity of fibers in the subset of optical fibers (e.g., 1:G splitter). In another implementation, splitter 1010 may split the optical signal in another manner.

In operation of facility 1000, one of primary laser bank 405 or secondary laser bank 805 may be turned on and may output light of different wavelengths, and the other one of primary laser bank 405 or secondary laser bank 805 may be turned off and may output no light. Alternatively, as described above, certain lasers of primary laser bank 405 and certain lasers of secondary laser bank 805 may be turned on and may output light of different wavelengths, and certain other lasers of primary laser bank 405 and certain other lasers of secondary laser bank 805 may be turned off and may output no light.

Combiner 920 may receive light from primary laser bank 405 and/or secondary laser bank 805 (after multiplexing by multiplexer 410/810, amplifying by amplifier 410/810, and splitting by splitter 420/910), and provide the light to demultiplexer 430. Demultiplexer 430 may separate the light by wavelength and provide the light, of each wavelength, to a different transmitter 435. Each of transmitters 435 may modulate a data signal onto the light to form an optical signal, and may provide the optical signal to a corresponding splitter 1010. Each of splitters 1010 may split the optical signal by the quantity of fibers in each subset of optical fibers (e.g., G as shown in FIG. 10), and may provide each optical signal to a different one of multiplexers 440. Each of multiplexers 440 may receive optical signals of different wavelengths, may multiplex the optical signals, and may transmit the multiplexed optical signals on an optical fiber.

While different quantities and arrangements of components have been described with regard to the facilities of FIGS. 4 and 8-10, in other implementations, the quantity and/or arrangement of components, included in a facility, may differ. Further, any one of the facilities, of FIGS. 4 and 8-10, may include additional components or different components than are described above. Also, different sets of components may be packaged into a system. For example, a facility, such as facility 400, 800, 900, or 1000, may generally include a laser system connected to an optical transport system, as shown in FIG. 11.

Figure 11:
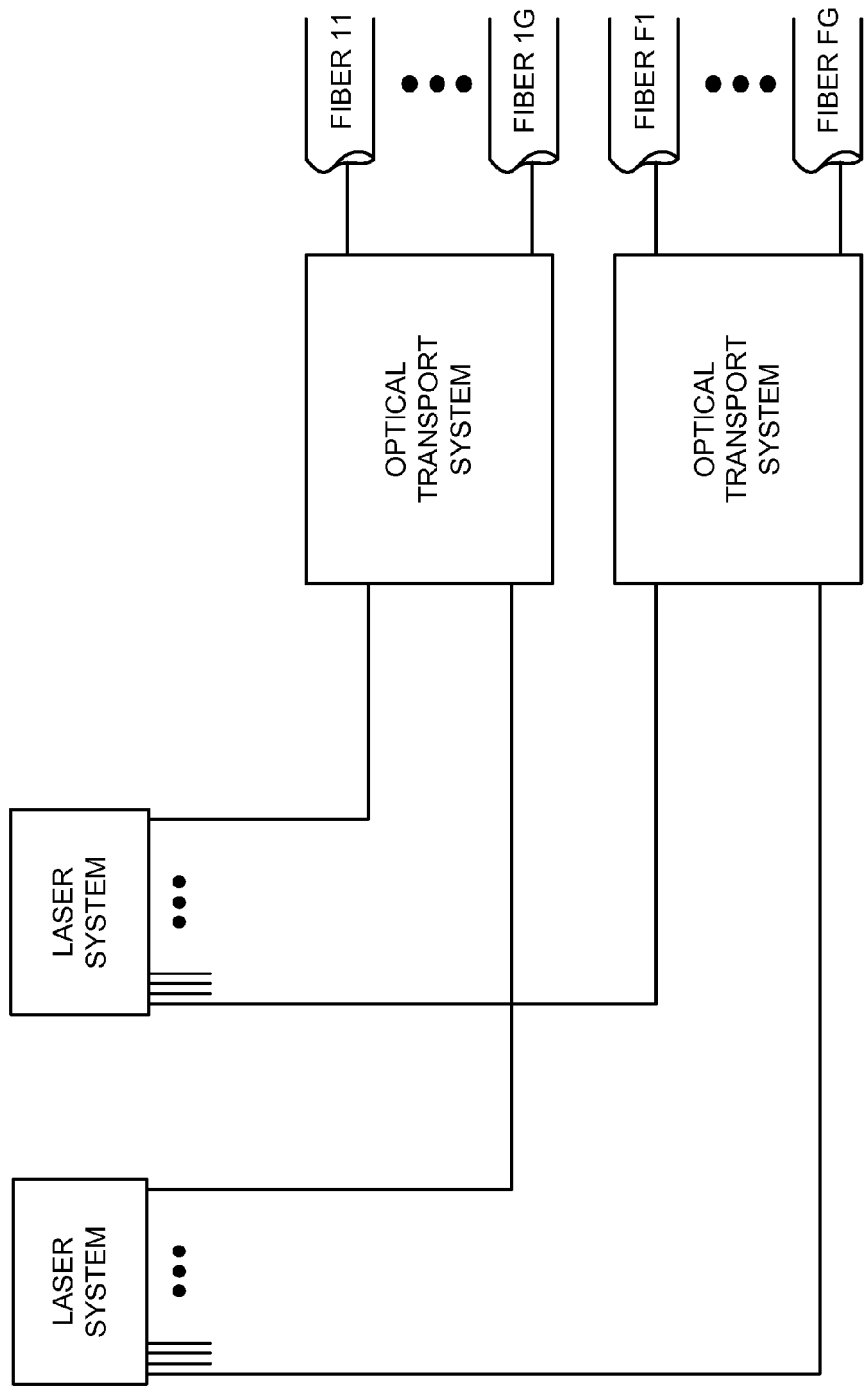
FIG. 11 is a diagram that generally depicts systems that may be included within a facility.
Figure 12A:
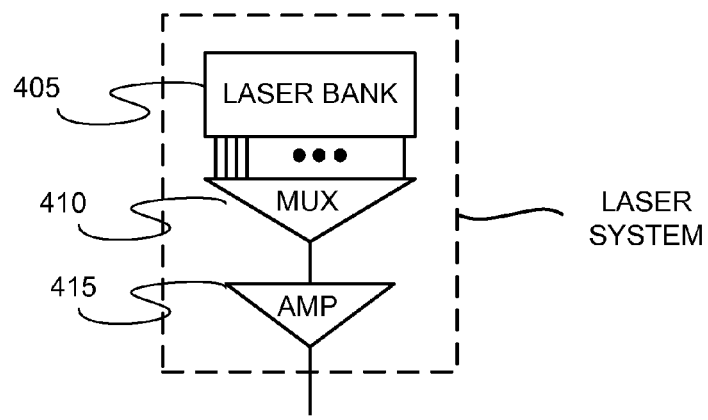
FIG. 12A is a diagram illustrating one particular arrangement of components of a laser system of FIG. 11.

FIG. 12A is a diagram illustrating one particular arrangement of components of a laser system of FIG. 11. As shown in FIG. 12A, a laser system may include laser bank 405, multiplexer 410, and amplifier 415. The components, of the laser system, may be packaged in a housing. As shown in FIG. 12A, the laser system may include a single optical fiber output to a splitter 420 (FIG. 4) or a combiner 820 (FIG. 8). In this case, splitter 420 or combiner 820 may be located external to the laser system.

Figure 12B:
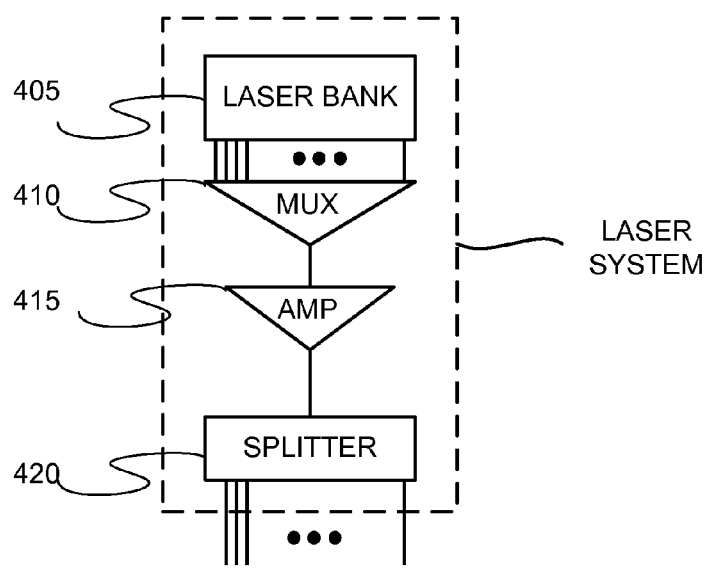
FIG. 12B is a diagram illustrating another particular arrangement of components of a laser system of FIG. 11.

FIG. 12B is a diagram illustrating another particular arrangement of components of a laser system of FIG. 11. As shown in FIG. 12B, a laser system may include laser bank 405, multiplexer 410, amplifier 415, and splitter 420. The components, of the laser system, may be packaged in a housing. As shown in FIG. 12B, the laser system may include multiple optical fiber outputs, one for each output of splitter 420. In this case, splitter 420 is located internal to the laser system.

Figure 13A:
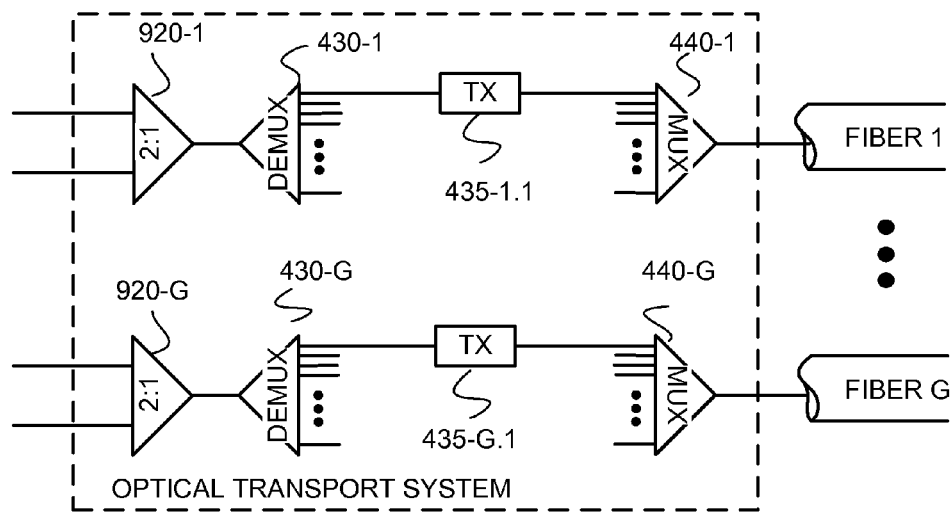
FIG. 13A is a diagram illustrating one particular arrangement of components of a portion of an optical transport system of FIG. 11.

FIG. 13A is a diagram illustrating one particular arrangement of components of a portion of an optical transport system of FIG. 11. As shown in FIG. 13A, an optical transport system may include a number of components associated with a subset of optical fibers (e.g., shown as G optical fibers in FIG. 13A). For example, the optical transport system may include combiners 920, demultiplexers 430, transmitters 435, and multiplexers 440. The components, of the optical transport system, may be packaged in a housing. As shown in FIG. 13A, the optical transport system may include G optical fiber outputs, and may include 2*G inputs from the laser systems (e.g., one input per laser system and per optical fiber output).

Figure 13B:
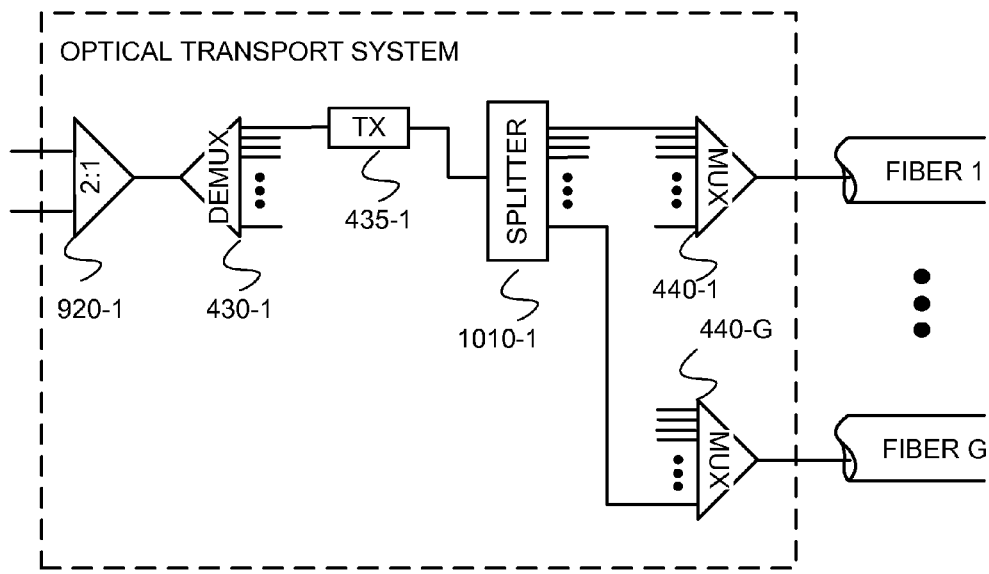
FIG. 13B is a diagram illustrating another particular arrangement of components of a portion of an optical transport system of FIG. 11.

FIG. 13B is a diagram illustrating another particular arrangement of components of a portion of an optical transport system of FIG. 11. As shown in FIG. 13B, an optical transport system may include a number of components associated with a subset of optical fibers (e.g., shown as G optical fibers in FIG. 13B). For example, the optical transport system may include a combiner (shown as combiner 920-1), demultiplexers 430, transmitters 435, splitters (shown as a single splitter 1010-1), and multiplexers 440. The components, of the optical transport system, may be packaged in a housing. As shown in FIG. 13B, the optical transport system may include G optical fiber outputs, and may include two inputs from the laser systems (e.g., one input per laser system).

An implementation, described herein, may amortize the cost of expensive optical components, such as lasers, to reduce the overall cost of the facility. Rather than including a separate laser in each transmitter of an optical fiber interface, the lasers may be included in a laser bank that permits the light to be used by all of the transmitters. Because the lasers are being reused, more expensive lasers can be used while still reducing the overall cost of the facility. The lasers may be constructed to be very precise, which permits the lasers to transmit at longer distances.

Also, the relative frequency of the lasers, with respect to one another, may be locked/fixed. The lasers may be packaged so that the lasers are all at the same approximate temperature (e.g., within a fraction of a degree Celsius), which lets the lasers drift together. The lasers may be packaged tightly (e.g., more tightly than 50 GHz), which permits more wavelengths to be used in the C-band. As a result, more bandwidth may be used on a single optical fiber.

Power reduction may also be achieved over systems that include separate lasers in the transmitters of the optical fiber interfaces. Lasers have to operate at controlled temperatures; otherwise, lasers fail. By placing the lasers on the same substrate in a laser bank, the temperature of the lasers can be more easily controlled over lasers placed close to the optical fiber interfaces. Power reduction can be achieved by eliminating the need for separate temperature control systems, and facilitating temperature control of the lasers in the laser bank.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a processor).

Further, certain components have been described, with regard to FIGS. 4 and 8-10, as being included in a facility. In one alternative implementation, the components of FIGS. 4 and 8-10 may be included in a single optical transport device.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A system comprising:
   a laser bank that includes a plurality of lasers;
   a first multiplexer connected to the laser bank;
   an amplifier connected to the first multiplexer;
   a first splitter connected to the amplifier;
   a demultiplexer connected to the first splitter;
   a plurality of transmitters connected to the demultiplexer;
   a second splitter connected to one of the plurality of transmitters; and
   a second multiplexer connected to the second splitter.

2. The system of claim 1, where the second multiplexer multiplexes optical signals to create multiplexed optical signals, and
   where the multiplexed optical signals are transmitted via an optical fiber.

3. The system of claim 1, where the laser bank includes:
   a temperature control to control a temperature of one or more of the plurality of lasers.

4. The system of claim 1, where the one of the plurality of transmitters comprises:
   an electrical processor,
   a driver connected to the electrical processor, and
   a modulator connected to the driver and the demultiplexer.

5. The system of claim 1, where the plurality of lasers includes fixed lasers.

6. The system of claim 1, further comprising:
   another laser bank that includes a plurality of lasers;
   a third multiplexer connected to the other laser bank;
   another amplifier connected to the third multiplexer;
   a third splitter connected to the other amplifier;
   a combiner connected to the third splitter;
   a demultiplexer connected to the combiner.

7. The system of claim 1, further comprising a third multiplexer connected to the second splitter.

8. A system comprising:
   a laser bank that includes a plurality of lasers;
   a multiplexer connected to the laser bank;
   an amplifier connected to the multiplexer;
   a first splitter connected to the amplifier; and
   a plurality of optical transport systems connected to the first splitter,
      one of the plurality of optical transport systems including:
         a combiner connected to the first splitter,
         a demultiplexer connected to the combiner, a plurality of transmitters connected to the demultiplexer, and a plurality of second splitters, each of the plurality of second splitters being connected to a respective one of the plurality of transmitters.

9. The system of claim 8, where the laser bank comprises:
a substrate;
a temperature control to control a temperature of one or more of the plurality of lasers; and
a controller, the plurality of lasers including at least one tunable laser,
the plurality of lasers being mounted on the substrate.

10. The system of claim 8, where the plurality of lasers includes fixed lasers and at least one tunable laser.

11. The system of claim 8, where the laser bank includes:
a substrate;
the plurality of lasers being mounted on the substrate; and
a cooling system to control a temperature of the plurality of lasers.

12. The system of claim 8, where one of the plurality of second splitters is connected to another multiplexer.

13. The system of claim 12, where the other multiplexer multiplexes optical signals to create multiplexed optical signals, and
where the multiplexed optical signals are transmitted via an optical fiber connected to the other multiplexer.

14. The system of claim 8, further comprising:
another laser bank that includes a plurality of lasers;
another multiplexer connected to the other laser bank;
another amplifier connected to the other multiplexer; and
a third splitter connected to the other amplifier, the third splitter being connected to the combiner.

15. A system comprising:
a laser bank that includes a plurality of lasers;
a first multiplexer connected to the laser bank;
an amplifier connected to the first multiplexer;
a splitter connected to the amplifier; and
a plurality of optical transport systems connected to the splitter, one of the plurality of optical transport systems including:
a combiner connected to the splitter,
a demultiplexer connected to the combiner,
a plurality of transmitters connected to the demultiplexer, and
a second multiplexer connected to one of the plurality of transmitters.

16. The system of claim 15, further comprising:
another laser bank that includes a plurality of lasers;
a third multiplexer connected to the other laser bank;
another amplifier connected to the third multiplexer; and
another splitter connected to the other amplifier.

17. The system of claim 16, where the plurality of lasers includes at least one fixed laser and at least one tunable laser.

18. The system of claim 16, further comprising:
a processor to control the plurality of lasers and to identify a failed laser of the plurality of lasers.

19. The system of claim 15, where another one of the plurality of optical transport systems includes:
another combiner connected to the splitter,
another demultiplexer connected to the other combiner,
a transmitter connected to the other demultiplexer, and
another splitter connect to the transmitter.

20. The system of claim 19, where the other one of the plurality of optical transport systems further includes:
one or more third multiplexers connected to the other splitter.

* * * * *